US012270249B2

(12) United States Patent
Chen

(10) Patent No.: US 12,270,249 B2
(45) Date of Patent: *Apr. 8, 2025

(54) SECURITY GATE

(71) Applicant: North States Industries, Inc., Plymouth, MN (US)

(72) Inventor: Hua Chen, Zhejiang (CN)

(73) Assignee: NORTH STATES INDUSTRIES, INC., Plymouth, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/615,299

(22) Filed: Mar. 25, 2024

(65) Prior Publication Data

US 2024/0295143 A1 Sep. 5, 2024

Related U.S. Application Data

(63) Continuation of application No. 17/304,658, filed on Jun. 24, 2021, now Pat. No. 11,976,513.

(Continued)

(51) Int. Cl.

*E06B 7/32* (2006.01)
*E06B 9/04* (2006.01)
*E06B 9/00* (2006.01)

(52) U.S. Cl.

CPC .................. *E06B 7/32* (2013.01); *E06B 9/04* (2013.01); *E06B 2009/002* (2013.01)

(58) Field of Classification Search

CPC ...... E06B 2009/002; E06B 9/04; E06B 7/082; E06B 11/025; E05B 65/0864; F16B 7/10; F16B 7/1463; E05C 17/30

See application file for complete search history.

(56) References Cited

U.S. PATENT DOCUMENTS

| | | | |
|---|---|---|---|
| 270,309 | A | 1/1883 | Harrison et al. |
| 812,229 | A | 2/1906 | Power |
| 1,189,410 | A | 7/1916 | Van Every |
| 1,242,757 | A | 10/1917 | Anway |
| 1,511,455 | A | 10/1924 | Freyberg et al. |

(Continued)

FOREIGN PATENT DOCUMENTS

| | | |
|---|---|---|
| CA | 152521 | 6/2014 |
| GB | 571856 | 5/1952 |

(Continued)

OTHER PUBLICATIONS

Auto-close Pet Gate, http://www.wayfair.com/Auto-close-Pet-Gate-33661-G17-PZQ1028.html, 3 pages (retrieved Jul. 20, 2016).

(Continued)

*Primary Examiner* — Catherine A Kelly
*Assistant Examiner* — Patrick B. Ponciano
(74) *Attorney, Agent, or Firm* — Merchant & Gould P.C.

(57) ABSTRACT

An example security gate can include: an outer frame; an outer gate disposed within the outer frame, the outer gate defining a plane and having a plurality of outer gate vertical members, and the outer gate defining an inner gate opening; an inner gate disposed within the outer gate, the inner gate defining a plurality of inner gate vertical members, wherein the inner gate is configured to move vertically within the plane to control access through the inner gate opening, and wherein the plurality of inner gate vertical members are sized to telescope within the plurality of outer gate vertical members as the inner gate is moved; and a locking mechanism to lock the inner gate at a vertical position relative to the outer gate to define an accessible size of the inner gate opening.

19 Claims, 10 Drawing Sheets

Related U.S. Application Data

(60) Provisional application No. 62/705,652, filed on Jul. 9, 2020.

(56) References Cited

U.S. PATENT DOCUMENTS 1,542,151 A 6/1925 Lehtonene
2,195,291 A * 3/1940 Zukor .................... G08B 13/08 200/61.93
2,275,914 A 3/1942 Lorenz
2,459,884 A * 1/1949 Kopf ......................... E06B 9/01 160/223
2,651,814 A 9/1953 Lester, Jr.
2,803,074 A * 8/1957 Brokish .................. E06B 11/02 49/55
2,851,746 A 9/1958 Brokish
2,972,825 A 2/1961 Stillwell et al.
3,589,576 A 6/1971 Rinkle et al.
3,906,671 A 9/1975 Moldonado
3,985,174 A 10/1976 Bricker
4,053,007 A 10/1977 Griffith
4,334,573 A 6/1982 Hackman et al.
4,465,262 A 8/1984 Itri et al.
4,475,311 A * 10/1984 Gibson ..................... E05C 1/10 49/176
4,583,715 A 4/1986 Wright
4,607,455 A 8/1986 Bluem et al.
4,611,431 A 9/1986 Lauro
4,624,072 A * 11/1986 Zilkha ....................... E06B 9/02 49/55
4,628,635 A 12/1986 Maillard
4,677,791 A 7/1987 Larson et al.
4,685,247 A 8/1987 Alam
4,702,036 A 10/1987 Johnson
4,713,922 A 12/1987 Ingold
4,760,872 A 8/1988 Hale, Jr.
4,776,133 A 10/1988 Green
4,777,765 A 10/1988 Johnson, Jr.
4,937,975 A * 7/1990 Zilkha ....................... E05C 9/08 49/55
5,020,834 A * 6/1991 Zilkha ................. E05B 65/1033 49/56
5,060,421 A 10/1991 Castelli
5,117,585 A 6/1992 Andrisin, III
5,131,186 A * 7/1992 Lamont ................ E05C 19/003 49/55
5,185,954 A 2/1993 Waddle, Sr.
5,272,840 A 12/1993 Knoedler et al.
5,287,654 A 2/1994 Davlantes
5,442,881 A 8/1995 Asbach et al.
5,461,827 A * 10/1995 Lofton ...................... E06B 9/02 D25/48.8
5,535,550 A 7/1996 Yang
5,544,870 A 8/1996 Kelley et al.
5,551,188 A 9/1996 Davlantes
5,657,592 A 8/1997 Davlantes
5,735,079 A 4/1998 Davlantes
5,797,218 A 8/1998 Holland
5,809,694 A 9/1998 Postans
5,946,855 A 9/1999 Miconi
6,018,916 A 2/2000 Henry
6,027,104 A 2/2000 Alexander et al.
D422,367 S 4/2000 Mishina
6,056,038 A 5/2000 Foster et al.
6,161,334 A 12/2000 Goodin
6,176,042 B1 1/2001 Rossman et al.
6,178,693 B1 * 1/2001 Hunt .................... A01K 1/0023 49/63
6,253,490 B1 7/2001 Postans
6,385,909 B1 5/2002 Marsh et al.
6,446,395 B2 9/2002 Rogers
6,499,254 B2 12/2002 Rossman et al.
6,655,087 B2 12/2003 Anderson
6,681,523 B1 1/2004 Stener
6,681,524 B1 1/2004 Tillson
6,681,720 B1 1/2004 Skurdalsvold et al.
6,715,182 B2 4/2004 Cheng
6,725,806 B1 4/2004 Gribble
6,877,721 B2 4/2005 Calverley
6,990,926 B2 1/2006 Gao
7,152,372 B2 12/2006 Cheng
7,293,530 B2 11/2007 Italiano
7,334,624 B2 2/2008 Waldman et al.
7,373,755 B2 5/2008 Jefferys et al.
D577,465 S 9/2008 Eren
7,540,046 B1 6/2009 Lai
7,568,449 B2 8/2009 Hirokawa et al.
7,739,983 B2 6/2010 Hirokawa et al.
7,950,184 B2 5/2011 Flannery
7,963,575 B2 6/2011 Mayo et al.
7,975,431 B2 7/2011 Flannery
7,984,695 B1 7/2011 Shaffer
8,141,517 B2 3/2012 Shimoda et al.
8,196,348 B2 * 6/2012 Flannery ................... E06B 9/04 49/55
8,333,037 B2 12/2012 Sulivan
8,434,264 B2 5/2013 Bosserdet, Jr.
8,448,381 B2 5/2013 Flannery
8,607,502 B2 12/2013 Flannery et al.
8,627,603 B2 1/2014 Flannery
8,745,922 B1 6/2014 Matsuda et al.
D708,354 S 7/2014 Weisbeck et al.
8,806,812 B2 8/2014 Kolovich et al.
8,997,400 B2 4/2015 Louie et al.
9,127,496 B1 9/2015 Flannery et al.
9,382,740 B2 7/2016 Flannery et al.
9,382,750 B1 7/2016 Flannery et al.
9,447,631 B2 7/2016 Christie
9,458,668 B1 9/2016 Flannery
9,615,672 B2 4/2017 Weisbeck et al.
9,689,197 B1 6/2017 Flannery et al.
9,890,570 B2 2/2018 Horwood
9,915,093 B2 3/2018 Weisbeck et al.
10,060,160 B2 8/2018 Wang et al.
10,287,819 B1 5/2019 Flannery
10,633,812 B1 * 4/2020 Fisher ....................... E02B 7/28
10,934,769 B2 3/2021 Flannery et al.
11,041,340 B1 6/2021 Flannery et al.
11,466,512 B2 10/2022 Morris
D975,387 S 1/2023 Hu
11,976,513 B2 * 5/2024 Chen ......................... E06B 7/32
2003/0110704 A1 6/2003 Cheng
2004/0045222 A1 3/2004 Hicks
2006/0169217 A1 8/2006 Glassford
2006/0260195 A1 11/2006 Witman et al.
2007/0003365 A1 1/2007 Walt, II et al.
2007/0017156 A1 1/2007 Robinson et al.
2007/0227462 A1 10/2007 Huff
2012/0055092 A1 3/2012 Boucquey et al.
2012/0233922 A1 * 9/2012 Flannery ................... E06B 9/04 49/55
2013/0036672 A1 2/2013 Westerfield
2015/0101250 A1 4/2015 Marsden
2017/0055486 A1 3/2017 Bin
2019/0063113 A1 2/2019 Milligan et al.
2022/0316267 A1 * 10/2022 He ............................ E06B 7/32

FOREIGN PATENT DOCUMENTS

GB 787142 12/1957
GB 1571070 A 7/1980
GB 2193992 A 2/1988
GB 2234281 A 1/1991
WO 02/099238 A1 12/2002
WO 03/052231 A1 6/2003

OTHER PUBLICATIONS

RIS 4-Panel Pet Pen, http://www.petsmart.com/dog/pens/iris4panelpetpenzid366817/cat36catid1001071, 1 page (retrieved Jul. 18, 2016).

Pet Gates, http://www.carlsonpetproducts.com/products/petgates/, 2 pages (retrieved Jul. 18, 2016).

(56) References Cited

OTHER PUBLICATIONS

Precision Pet Exercise Pen with Door, http://www.petsmart.com/dog/pens/precision-pet-exercise-pen-with-door-id36-6840/cat-36-catid-100107, 1 page (retrieved Jul. 27, 2016).
Walk-Thru with Pet door, http://www.carlsonpetproducts.com/products/petgates/walkthruwithpetdoor/, 2 pages (retrieved Jul. 18, 2016).

* cited by examiner

SECURITY GATE

RELATED APPLICATION(S)

This patent application is related to U.S. patent application Ser. No. 15/229,325 filed on Aug. 5, 2016, the entirety of which is hereby incorporated by reference.

BACKGROUND

Security gates are commonly used to lock or close passageways such as conventional doorways and entrances to stairwells. The purpose of such gates is primarily security, such as keeping small children from accessing stairwells that could present a hazard, and also confinement, such as confining a pet to a particular room during the night.

A typical security gate is formed from one or more panels, each panel including a frame surrounding a lattice structure (e.g., a mesh) or series of bars formed therebetween so that one can see through the gate when the gate is in place.

Typically, the outer frame of a security gate is manually positioned between two stationary elements, such as a doorjamb. The security gate is then locked in place by a locking mechanism.

There is a need for user friendly security gates with multiple or compound passageways to allow selective access therethrough by different pets, children, and so forth.

SUMMARY

In one aspect, an example security gate includes: an outer frame; an outer gate disposed within the outer frame, the outer gate defining a plane and having a plurality of outer gate vertical members, and the outer gate defining an inner gate opening; an inner gate disposed within the outer gate, the inner gate defining a plurality of inner gate vertical members, wherein the inner gate is configured to move vertically within the plane to control access through the inner gate opening, and wherein the plurality of inner gate vertical members are sized to telescope within the plurality of outer gate vertical members as the inner gate is moved; and a locking mechanism to lock the inner gate at a vertical position relative to the outer gate to define an accessible size of the inner gate opening.

DETAILED DESCRIPTION

Figure 1:
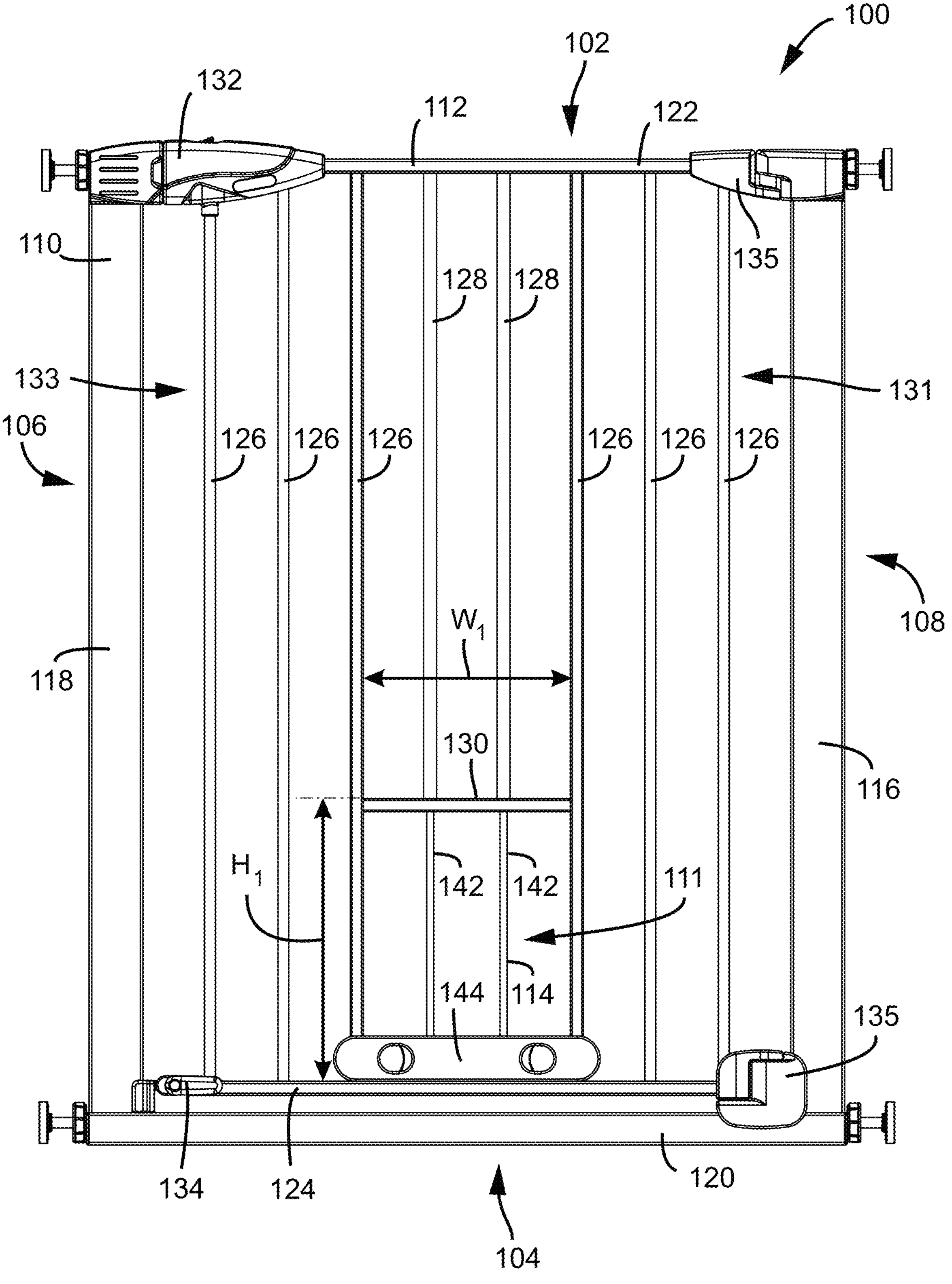
FIG. 1 is a view of an example security gate in accordance with the present disclosure.

The present disclosure is directed towards a security gate. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a front view of an example security gate 100 in accordance with the present disclosure. The security gate 100 has a top 102, a bottom 104, a first side 106, and a second side 108, and includes an outer frame 110, an outer gate 112, and an inner gate 114. The outer frame 110 includes a first vertical member 116, a second vertical member 118, and a horizontal member 120.

The outer gate 112 includes a first outer rail 122 and a second outer rail 124 that define a height of the outer gate 112. The outer gate 112 includes one or more complete inner rails 126 and one or more partial inner rails 128 that terminate at a member 130. The one or more complete inner rails 126 and one or more partial inner rails 128 span a width of the outer gate 112.

The outer gate 112 also includes one or more connectors 135 disposed towards a proximal side 131 of the outer gate 112, a latch 132 disposed towards a distal side 133 of the outer gate 112, the distal side 133 being opposite the proximal side 131, and a stop mechanism 134. The inner gate 114 includes vertical members 142 and a locking mechanism 144. More or fewer vertical members 142 can be provided in alternative embodiments.

The outer frame 110 houses the outer gate 112 and interfaces with one or more other elements of an enclosure to secure the security gate 100 in place. The security gate 100 may be used as a pressure-mounted gate, e.g., by placing the security gate 100 between stationary objects (such as a doorjamb) such that frictional pressure between the security gate 100 and the stationary objects keeps the security gate 100 upright. It should be appreciated that the security gate 100 may include one or more elements that apply pressure to stationary objects; in addition or alternatively, the security gate 100 may be coupled to one or more elements that apply such pressure (e.g., by expanding into the doorjamb). Alternatively, the security gate 100 may be coupled to a larger portable enclosing structure, such as a fence structure that spans an opening wider than the security gate 100. Similarly, the security gate 100 may be coupled to one or more elements of a portable enclosure (e.g., a play yard) having multiple fence panels which, when coupled to the security gate 100, form a self-contained enclosure for pets and/or children.

In some examples the complete inner rails 126 and the partial inner rails 128 are spaced sufficiently close to one another and sufficiently close to the first vertical member 116 and the second vertical member 118 to prevent a pet and/or child from moving through or getting caught between adjacent rails (126, 128), and/or between a rail (126, 128) and the first vertical member 116 or the second vertical member 118.

The connectors 135 movably connect the proximal side 131 of the outer gate 112 to the outer frame 110. In some examples the connectors 135 are pivoting connectors, allowing the outer gate 112 to swing or rotate about the connectors

135 relative to the outer frame 110. Non-limiting examples of the connectors 135 include hinges, pin-socket connections, and so forth.

The latch 132 detachably connects the distal side 133 of the outer gate 112 to the outer frame 110, enabling the outer gate 112 to be opened (i.e., when the latch 132 is detached from the outer frame 110) and closed (i.e., when the latch 132 is connected to the outer frame 110). In general terms, the outer gate 112 is an opened position when a first plane defined by the first outer rail 122 and the second outer rail 124 does not coincide with a second plane defined by the first vertical member 116 and the second vertical member 118 of the outer frame 110 and/or when both the latch 132 is detached from the outer frame 110; the outer gate 112 is in a closed position when the aforementioned first plane does coincide with the aforementioned second plane and one or both of the first locking mechanism is locked and the latch 132 is connected to the outer frame 110.

In some examples, the latch 132 includes an extendable and retractable projection operated by a spring biased button that extends the protrusion into (when the button is released), and retracts the protrusion from (when the button is pressed), a recess in the outer frame 110 that frictionally mates with the protrusion.

The stop mechanism 134, when engaged, only allows the outer gate 112 to swing in one direction. The stop mechanism 134 can be disposed anywhere on the outer gate 112 suitable for this purpose. In the example shown in FIG. 1, the stop mechanism 134 is disposed towards the distal end 133 of the outer gate 112 and reversibly engages the outer frame 110 to stop swinging (i.e., when the first locking mechanism engages the outer frame 110) and allow swinging (i.e., when the stop mechanism 134 does not engage the outer frame 110) of the outer gate 112.

The outer gate 112 is larger than the inner gate 114. Thus, the latch 132 may be operated to selectively allow or disallow large animals or children to pass through the security gate 100, while operation of the inner gate 114 (discussed in more detail below), selectively allows relatively smaller animals or objects to pass through the security gate 100.

Figure 2:
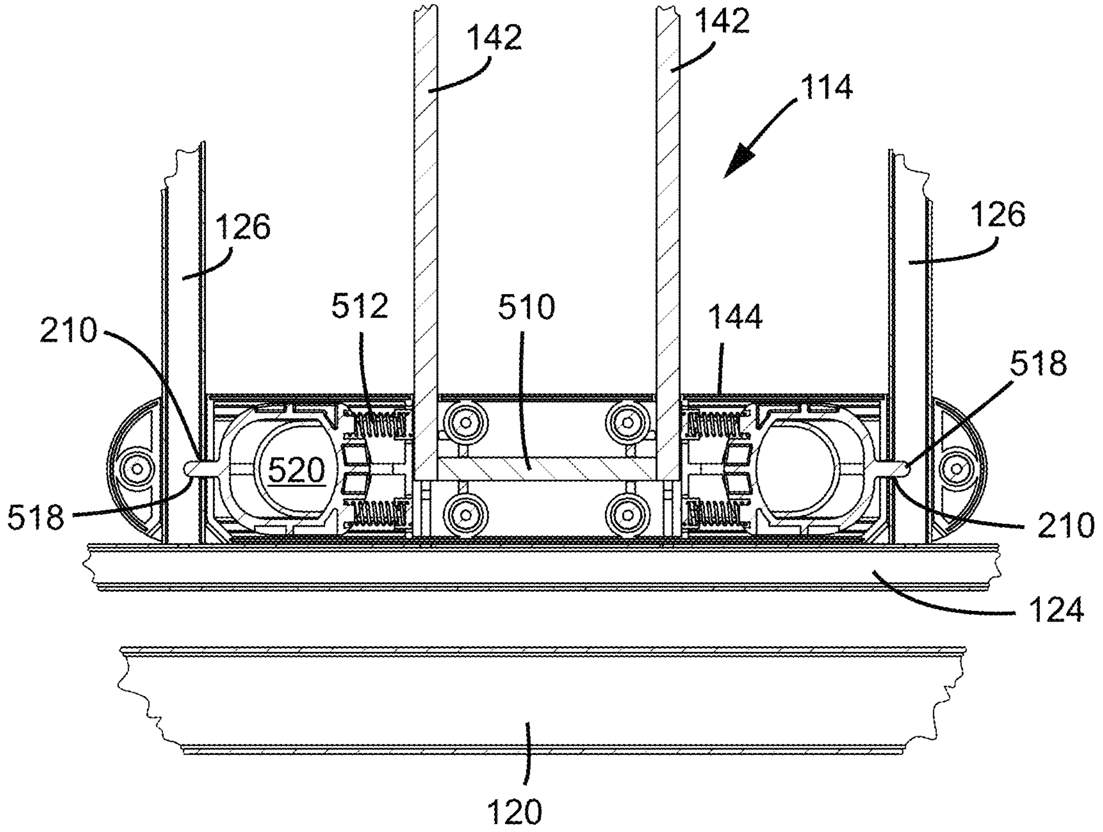
FIG. 2 is a cross-sectional view of a portion of the security gate of FIG. 1.
Figure 3:
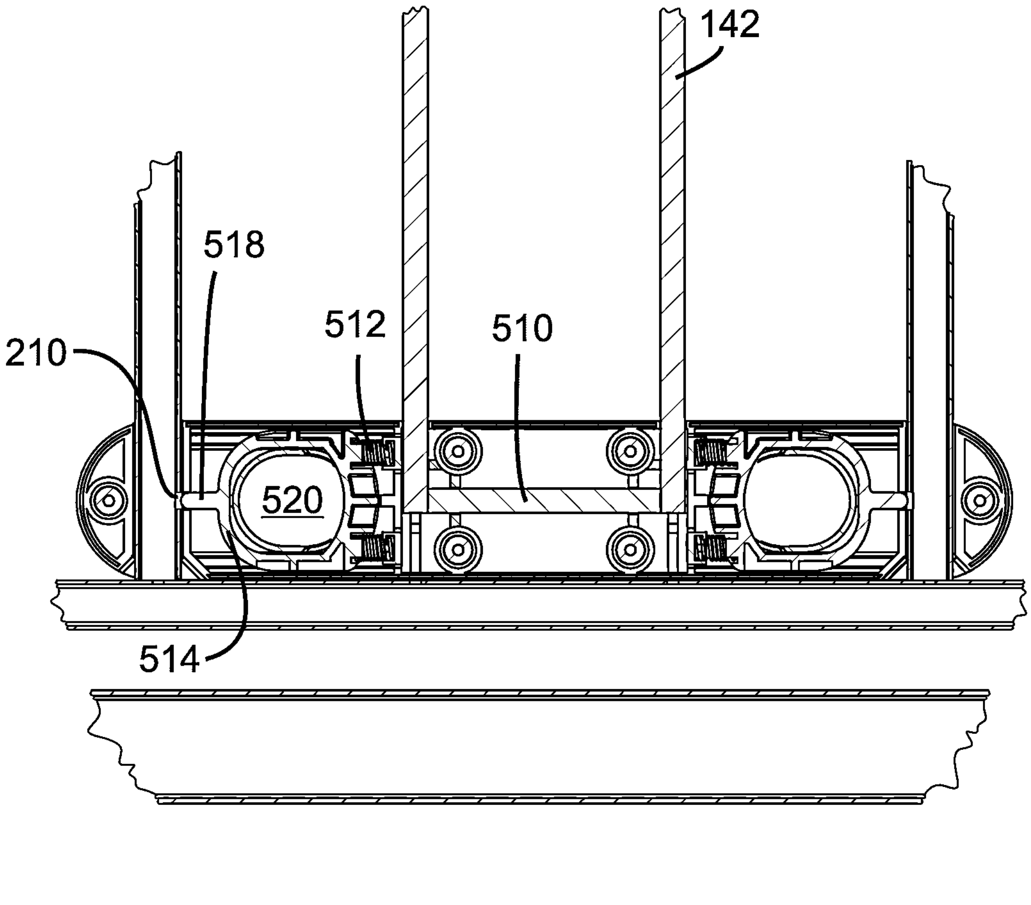
FIG. 3 is another cross-sectional view of the portion of the security gate of FIG. 1.

When in the closed position shown in FIGS. 1-3 with the locking mechanism 144 abutting the second outer rail 124, the inner gate 114 acts as a barrier within an opening 111 formed by the outer gate 112. When in a partially opened position (FIGS. 4-5) and/or a fully opened position (FIGS. 6-10), the inner gate 114 generally provides access to the opening 111 through which relatively small pets or other objects may be selectively allowed to pass, regardless of whether the outer gate 112 is closed or opened.

The inner gate 114 generally moves vertically in substantially the same plane as defined by the outer gate 112 between a closed position (FIGS. 1-3) to an opened position (FIGS. 6-10). The inner gate 114 can also define one or more intermediate or partially opened positions (FIGS. 4-5) between the closed position and the opened position.

As described further below, the vertical members 142 of the inner gate 114 extend through the member 130 and are sized to fit within the hollow interiors of the partial inner rails 128 as the inner gate 114 is moved from the closed to the opened positions. Specifically, the vertical members 142 and a corresponding bottom member 510 form a U-shaped design so that the vertical members 142 telescope into and out of the partial inner rails 128 as the inner gate 114 is opened (lifted in a direction A) and closed (lowered in a direction B). See FIGS. 5 and 8-9.

An inner diameter 532 of each of the partial inner rails 128 is therefore greater than an outer diameter 530 of each of the vertical member 142 to allow the vertical members 142 to be received in and moved upwards within the partial inner rails 128. In the opened position of FIGS. 6-10, the vertical members 142 are fully received (telescoped) within the partial inner rails 128 so that only the locking mechanism 144 is visible. In an alternative embodiment, the partial inner rails are instead sized to telescope within the vertical members. Other configurations are possible.

In some examples, a width $w_1$ of the opening 111 defined by the outer gate 112, which approximately corresponds to the width of the inner gate 114, is in a range from about 6 inches to about 12 inches. In a specific example, the width $w_1$ is approximately 8 inches. Widths $w_1$ outside of these values would also be suitable. In some examples, the maximum height h of the opening 111 defined by the outer gate 112, which approximately corresponds to the maximum height of the inner gate 114, is in a range from about 8 inches to about 15 inches. In a specific example, the maximum height $h_1$ is approximately 11 inches. Maximum heights h outside of these values would also be suitable.

The locking mechanism 144 is mounted to the inner gate 114. More specifically, the locking mechanism 144 is formed of two pieces, with a first piece positioned on one side of the inner gate 114 and a second piece positioned on another side of the inner gate 114. The two pieces capture one another in a clamshell arrangement, such as through complementary snaps or by using fastening members like screws.

As shown in FIGS. 2-3, 5, and 8-10, the locking mechanism 144 captures a lower portion of the partial inner rails 128 and the bottom member 510 of the inner gate 114. In this configuration, the locking mechanism 144 is fixed relative to the vertical members 142 and the bottom member 510 and moves with the inner gate 114.

The locking mechanism 144 also captures the inner-most complete inner rails 126 coupled to the member 130. The locking mechanism 144 slides along the inner rails 126 to lock the inner gate 114 in the closed, partially opened, and opened positions.

Specifically, the locking mechanism 144 defines openings 520 sized to received fingers (e.g., thumb and index finger of a single hand and/or thumb/index finger of opposite hands) to move the locking mechanism 144 between a locked and an unlocked position. Positioned within the openings are opposing actuators 514 that move horizontally within channels 502 formed by the locking mechanism 144 towards and away from one another.

Springs 512 force the opposing actuators 514 towards each respective complete inner rail 126. In the closed position of FIG. 1-3, an engagement member 518 formed by each of the opposing actuators 514 is received in an opening 210 formed in an inner surface 522 of each respective complete inner rail 126. The positioning of the engagement member 518 within the openings 210 when the locking mechanism 144 is in the locked position holds the inner gate 114 in the closed position.

When the opposing actuators 514 are moved horizontally against the springs 512 towards one another into the unlocked position for the locking mechanism 144 (see, e.g., FIG. 3), each respective engagement member 518 is moved out of the respective opening to allow the inner gate 114 to move vertically from the closed position. Specifically, the user places a finger into each of the openings 520 of the locking mechanism 144 and forces the opposing actuators

514 towards one another (against the springs 512) to move the locking mechanism 144 to the unlocked position.

Once the inner gate 114 is at the desired vertical position, which defines a size of the opening 111 through the outer gate 112, the fingers are removed. This allows the springs 512 to move the opposing actuators 514 to again contact the inner surface 522 of the respective complete inner rail 126 to lock the vertical position of the inner gate 114.

Figure 4:
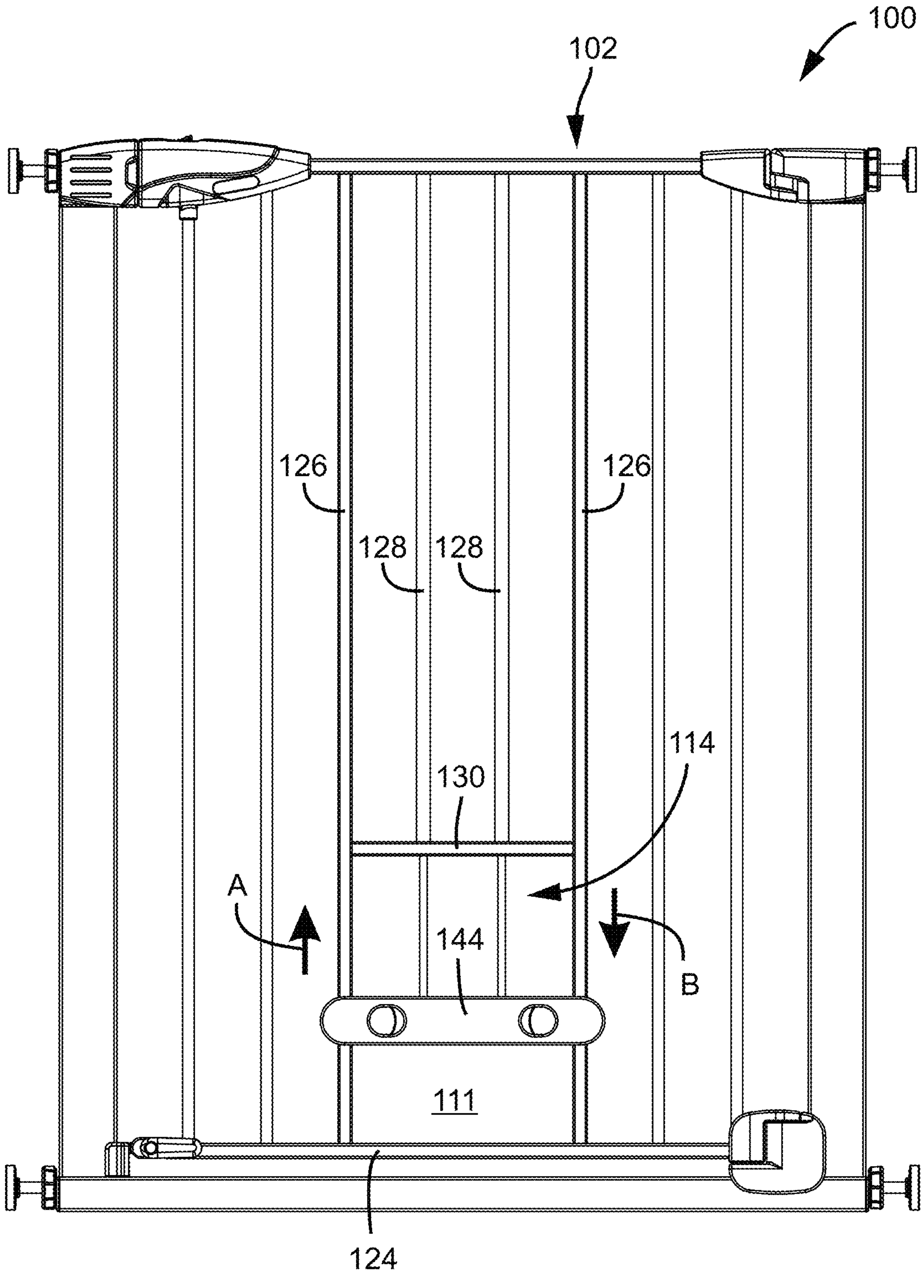
FIG. 4 is another view of the security gate of FIG. 1 with the inner gate in the partially opened position.
Figure 5:
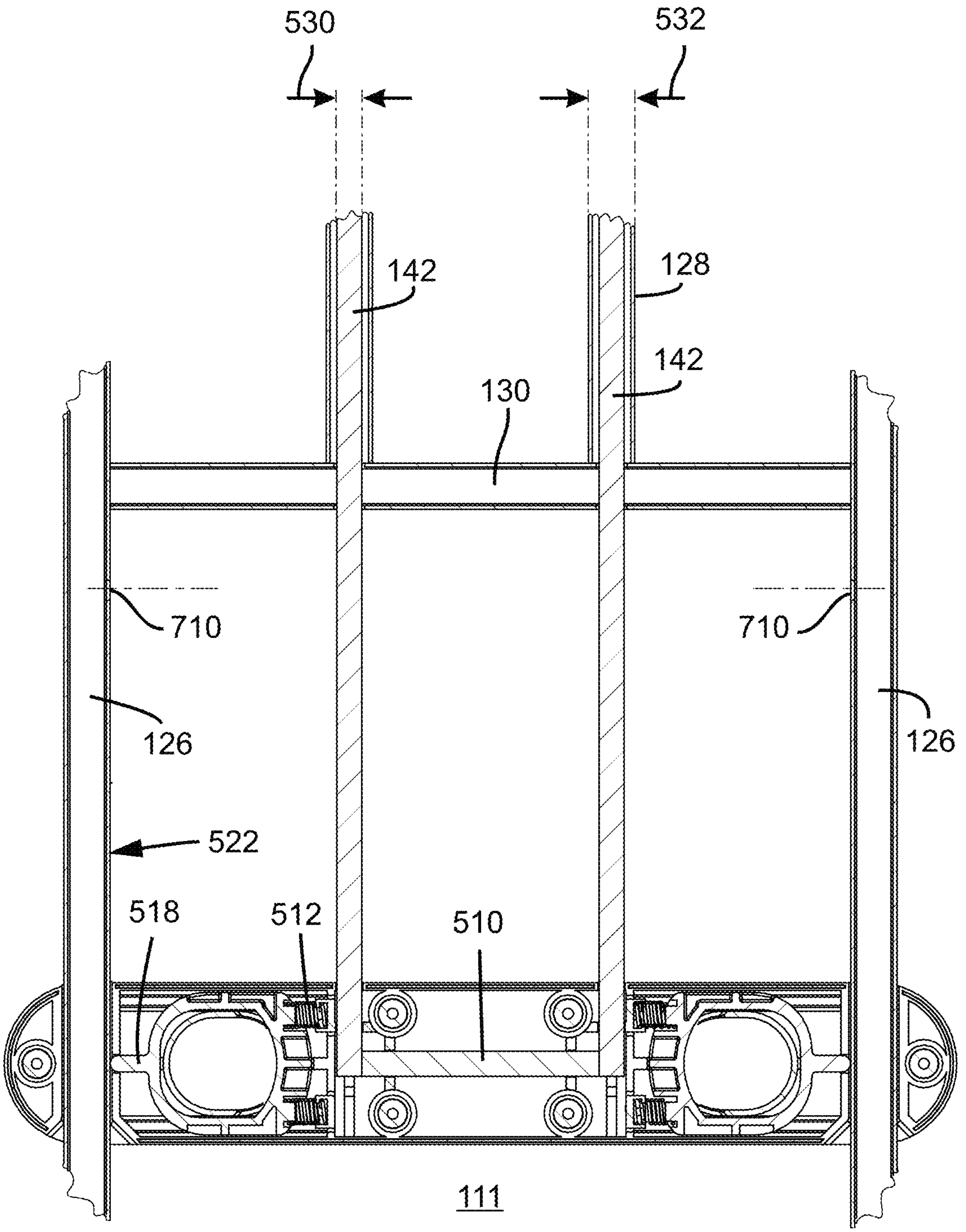
FIG. 5 is a cross-sectional view of a portion of the security gate of FIG. 4.
Figure 6:
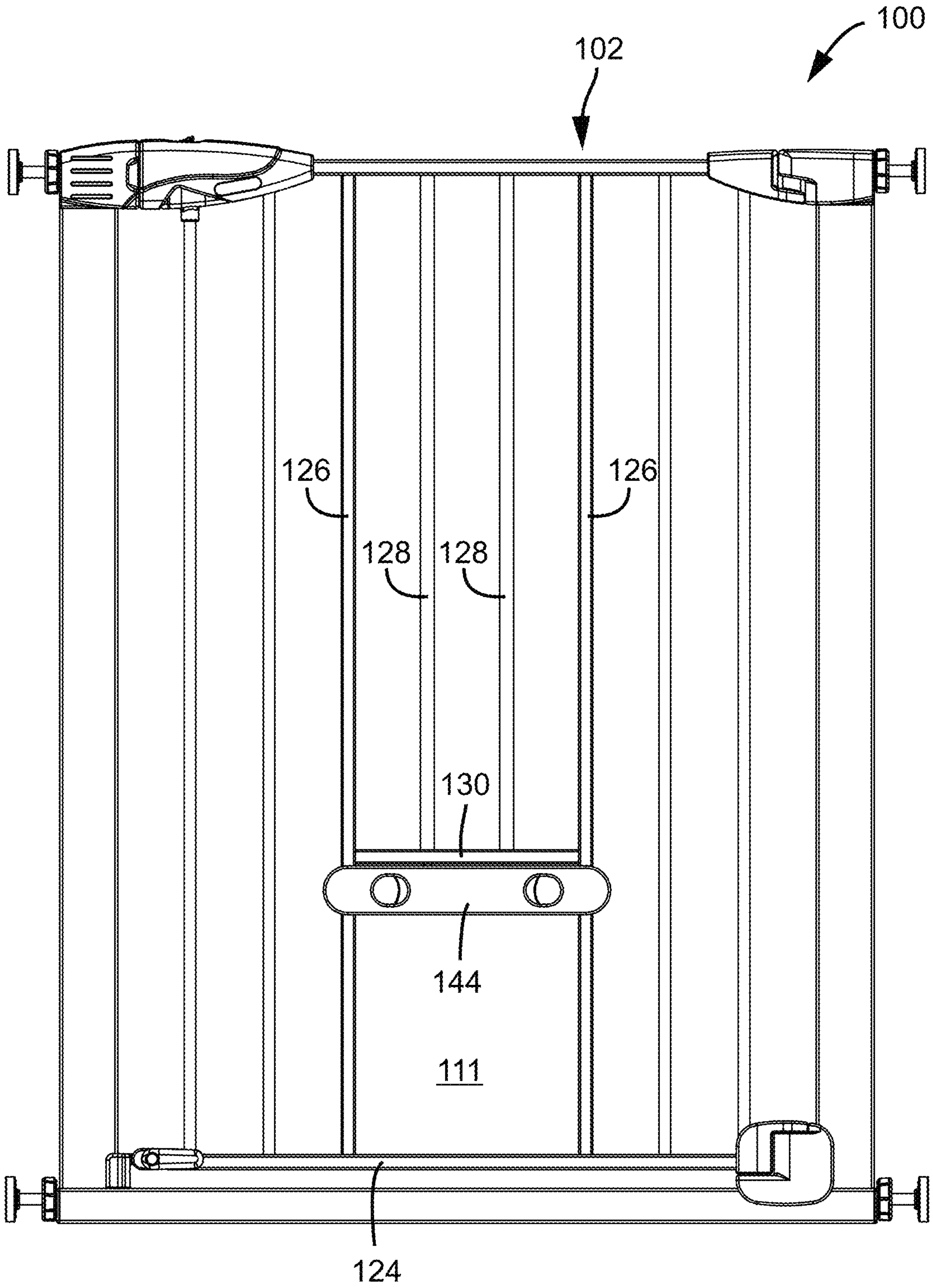
FIG. 6 is another view of the security gate of FIG. 1 with the inner gate in the partially opened position.
Figure 7:
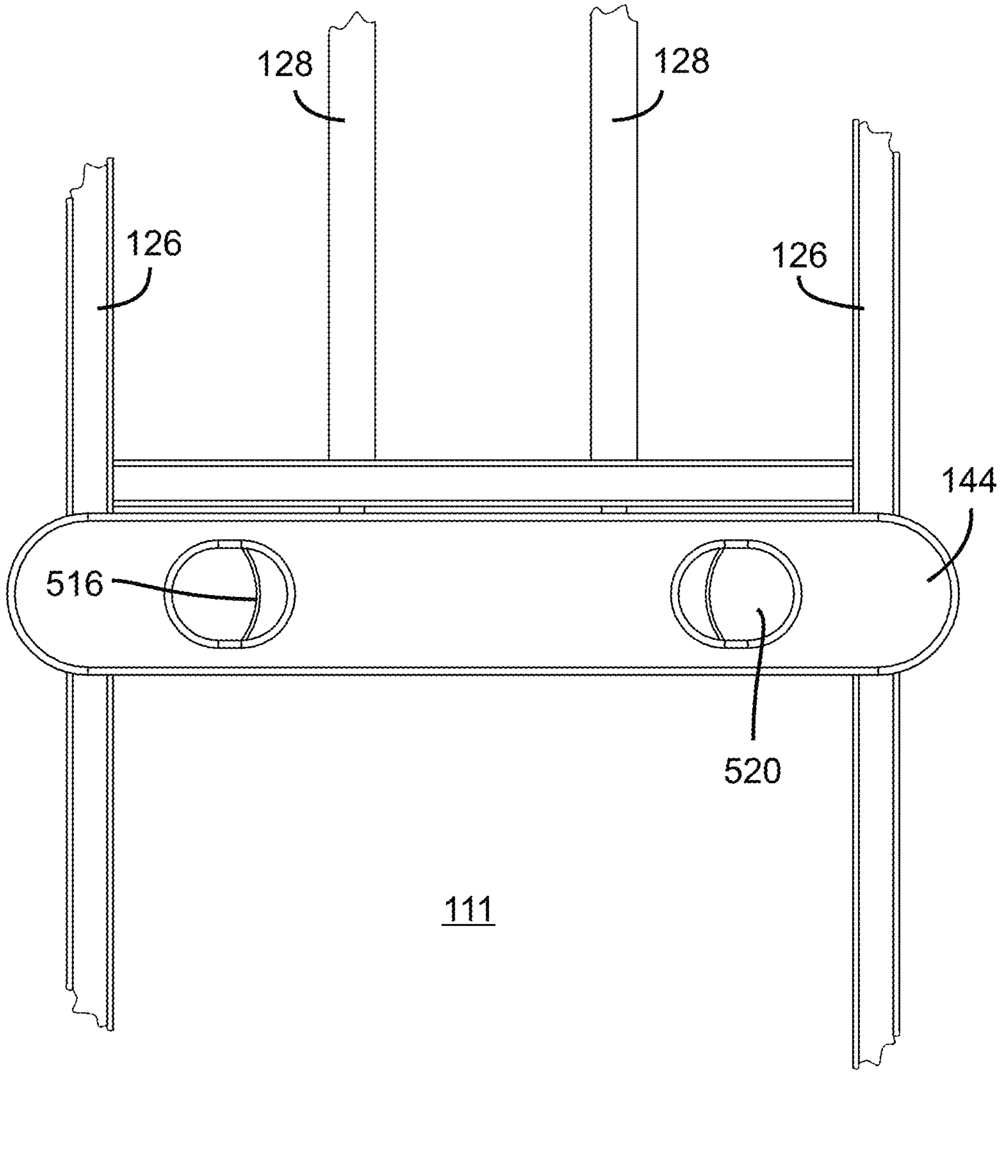
FIG. 7 is an enlarged view of a portion of the security gate of FIG. 6.
Figure 8:
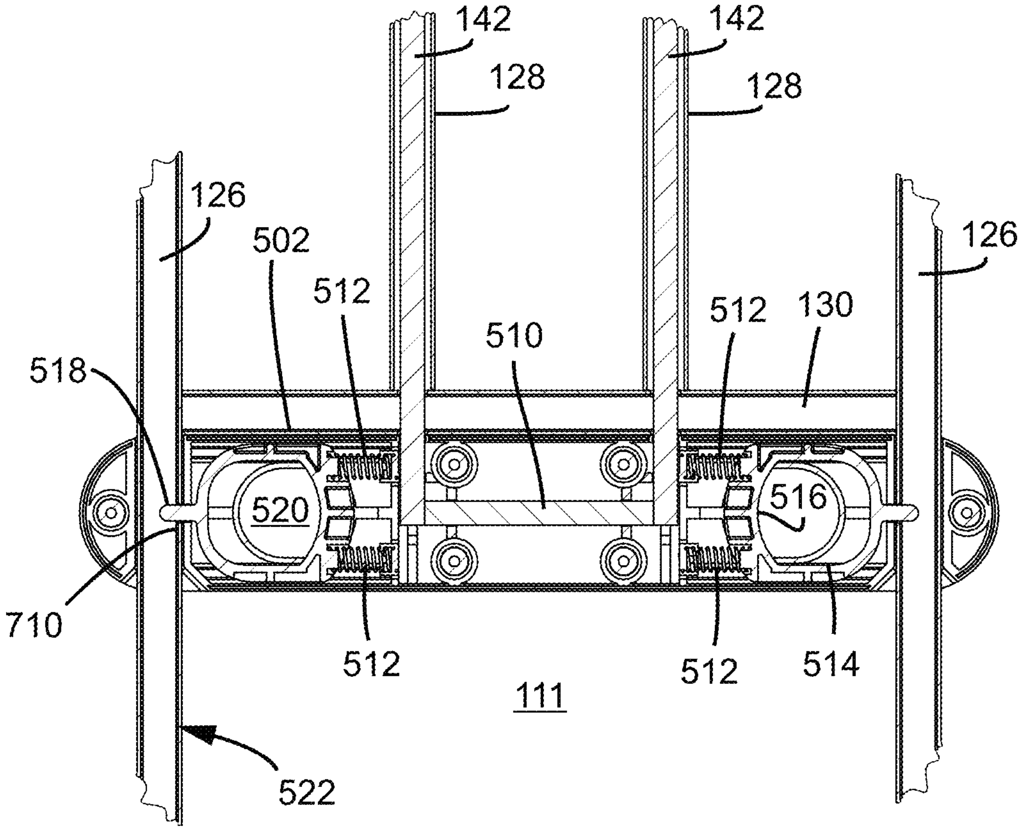
FIG. 8 is a cross-sectional view of a portion of the security gate of FIG. 6.
Figure 9:
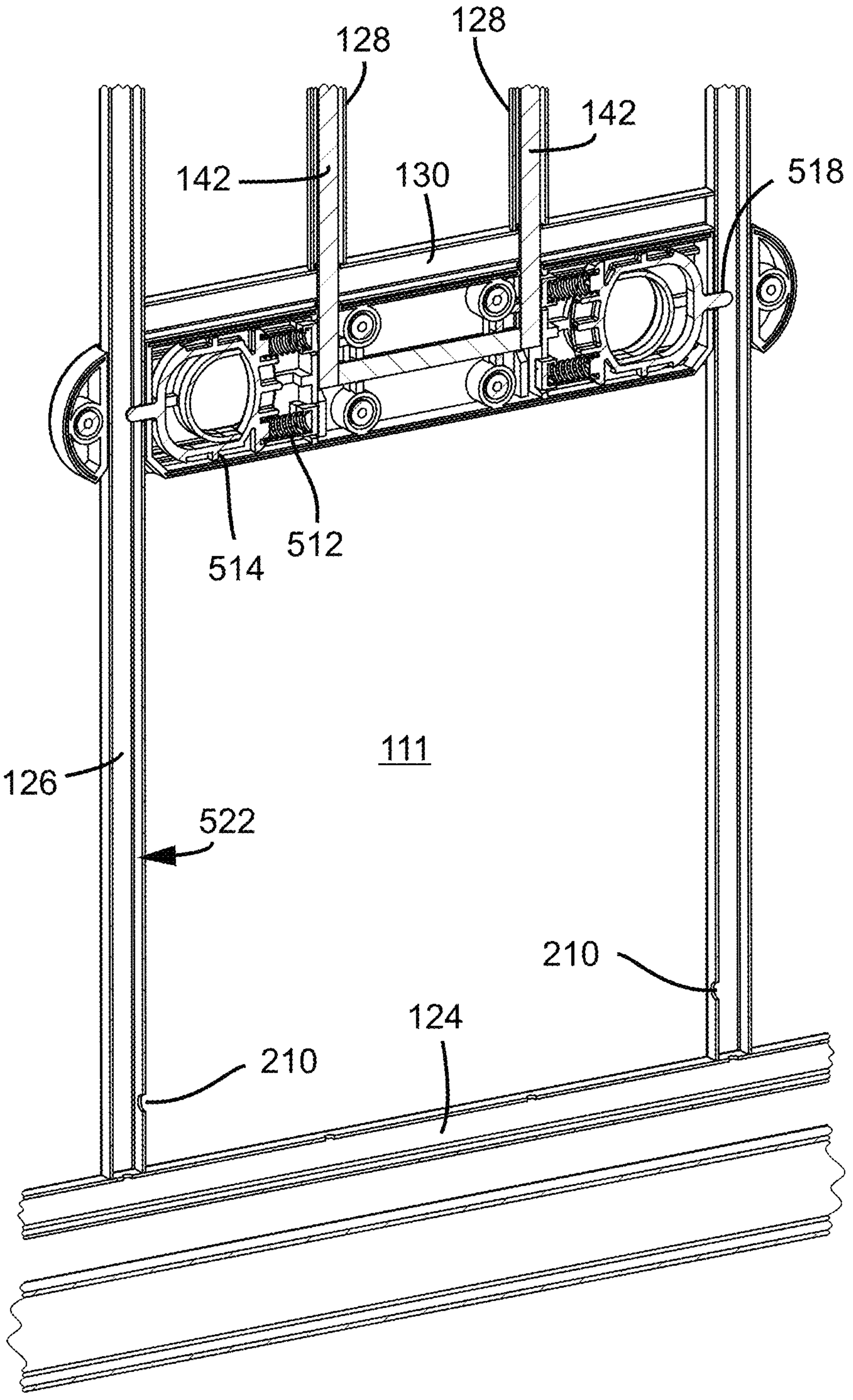
FIG. 9 is another cross-section view of a portion of the security gate of FIG. 6.
Figure 10:
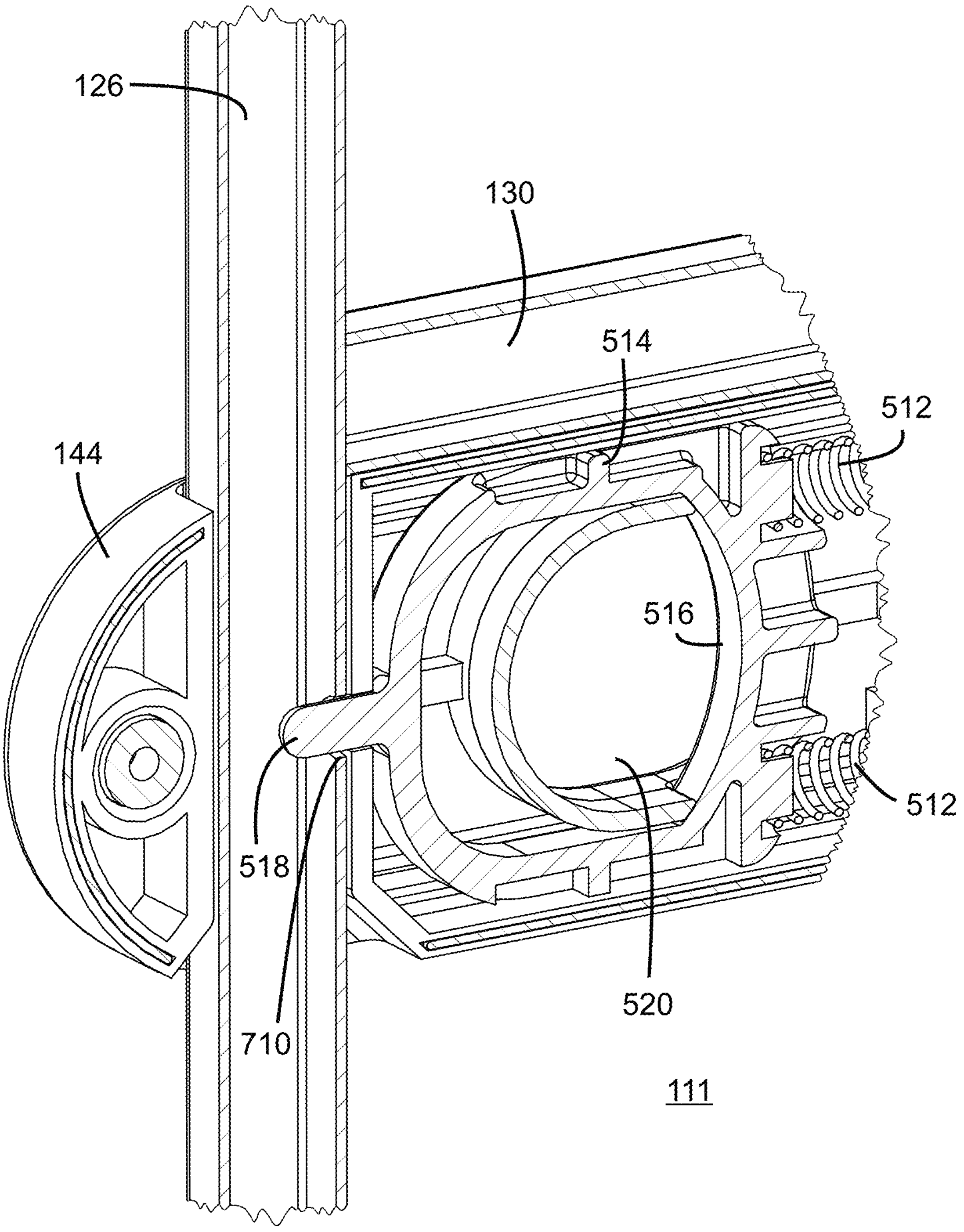
FIG. 10 is an enlarged view of a portion of the security gate of FIG. 9.

When the inner gate 114 is moved to any partially opened position and the locking mechanism 144 is released to allow the engagement members 518 to be biased by the springs 512 to the locked position shown in FIGS. 4-5, each engagement member 518 contacts the inner surface 522 of the respective complete inner rail 126. A frictional engagement is formed by the interface between each engagement member 518 and the inner surface 522 of each respective complete inner rail 126 to hold the locking mechanism 144 vertically relative to the outer gate 112. In the example shown, the inner gate 114 can be moved vertically to an infinite number of partially opened positions and locked in place by the locking mechanism 144.

When the inner gate 114 is moved to the opened position (with the locking mechanism 144 abutting the member 130) and the locking mechanism 144 is released, the engagement members 518 are to be biased by the springs 512 to the locked position so that each engagement member 518 is received in another opening 710 formed in the inner surface 522 of each respective complete inner rail 126, as shown in FIGS. 6-10. This locks the inner gate 114 in the opened position.

In an alternative embodiment, no holes are formed in the inner surface 522 of the complete inner rails 126. Instead, the engagement members 518 forms a frictional connection with each inner surface 522 to define all closed, partial, and opened positions. In another example, more than two openings are formed along the inner surface 522 of each complete inner rails 126 to define specific partially opened positions between the closed and open positions. Other configurations are possible.

In some examples, actuation of the locking mechanism 144 (e.g., the amount of force required to overcome the springs and/or the dexterity required to actuate the locking mechanism 144 against the springs 512) can be performed by adults, but not by small children or animals.

The various components of the security gates of the present disclosure can be manufactured from a variety of materials or combinations of materials. In one example, the outer frame 110, the outer gate 112, and the inner gate 114 are all made from metal. In some examples, immobilized junctions between component parts of the outer gate 112 are welded together, such as: the respective junctions between the first outer rail 122 and each of the complete inner rails 126 and the partial inner rails 128. Other materials, such as a relatively strong and rigid thermoplastic polymer (e.g., acrylonitrile butadiene styrene (ABS)) can also be used. The various components and aspects of the security gates of the present disclosure alternatively can be manufactured from other materials or combinations of materials.

In some examples, one or more components of the outer frame 110 and the outer gate 112 (e.g., the first vertical member 116, the second vertical member 118, the horizontal member 120, the first outer rail 122, the second outer rail 124, the one or more complete inner rails 126, the one or more partial inner rails 128) are at least substantially hollow to reduce weight and manufacturing and/or shipping costs. In other examples, one or more components of the outer frame 110 and the outer gate 112 are solid (i.e., not hollowed out).

There are various advantages associated with the gates described herein. The telescoping nature of the vertical members of the inner gate with the vertical members of the outer gate allows for a cleaner look and less pinch points for children and pets as the inner gate is opened and closed. The locking mechanism allows the inner gate to be opened at nearly an unlimited number of positions, thereby creating great flexibility of the vertical size of the resulting opening. Further, the locking mechanism for the inner gate can be actuated with a single hand, thereby allowing for greater ease as the inner gate is moved to modify the size of the opening.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A security gate, comprising:

an outer frame;

an outer gate disposed within the outer frame, the outer gate defining a plane and having a plurality of outer gate vertical members including complete vertical members and partial vertical members, and the outer gate defining an inner gate opening;

an inner gate disposed within the outer gate, the inner gate defining a plurality of inner gate vertical members, wherein the inner gate is configured to move vertically within the plane to control access through the inner gate opening, and wherein the plurality of inner gate vertical members are sized to telescope within the partial vertical members of the plurality of outer gate vertical members as the inner gate is moved; and a locking mechanism to lock the inner gate at a vertical position relative to the outer gate to define an accessible size of at least a portion of the inner gate opening, the locking mechanism fully surrounding two of the complete vertical members of the plurality of outer gate vertical members, the locking mechanism including an actuator configured to be biased into a locked position to hold the inner gate at the vertical position relative to the outer gate, the locking mechanism further including a first piece and a second piece, the first piece and the second piece being positioned on different sides, respectively, of one of the complete vertical members, the first piece and the second piece being coupled to each other with a fastener to fully surround, together:

(i) the one of the complete vertical members; and (ii) the actuator.

2. The security gate of claim 1, wherein end portions of the inner gate vertical members extend through openings in the locking mechanism into an interior of the locking mechanism.

3. The security gate of claim 2, wherein another member extends within the interior of the locking mechanism and connects the end portions.

4. The security gate of claim 3, wherein the inner gate vertical members and the another member form a U-shape.

5. The security gate of claim 1, wherein the inner gate vertical members are fixed within the locking mechanism.

6. The security gate of claim 1, wherein the inner gate defines a closed position wherein the inner gate blocks access through the inner gate opening.

7. The security gate of claim 6, wherein the inner gate defines a plurality of partially open positions that provide at least partial access through the inner gate opening.

8. The security gate of claim 1, wherein the locking mechanism includes a spring to bias the actuator into the locked position to hold the inner gate at the vertical position relative to the outer gate.

9. The security gate of claim 8, wherein the locking mechanism is moveable relative to the spring into an unlocked position that allows the inner gate to move relative to the outer gate.

10. The security gate of claim 1, wherein the locking mechanism includes opposing actuators that are biased into locked positions to hold the inner gate relative to the outer gate.

11. The security gate of claim 1, wherein one of the complete vertical members of the plurality of outer gate vertical members defines two openings spaced apart from each other along the one of the complete vertical members of the plurality of outer gate vertical members, each of the two openings being sized to receive an engagement member of the locking mechanism.

12. The security gate of claim 1, wherein a vertical height of the inner gate opening is in a range from about 8 inches to about 15 inches, and wherein a horizontal width of the inner gate opening is in a range from about 6 inches to about 12 inches.

13. A security gate, comprising:

an outer frame;

an outer gate disposed within the outer frame, the outer gate defining a plane and having a plurality of outer gate vertical members including complete vertical members and partial vertical members, and the outer gate defining an inner gate opening;

an inner gate disposed within the outer gate, the inner gate defining a plurality of inner gate vertical members, wherein the inner gate is configured to move vertically within the plane to control access through the inner gate opening, and wherein the plurality of inner gate vertical members are sized to telescope within the partial vertical members of the plurality of outer gate vertical members as the inner gate is moved; and a locking mechanism to lock the inner gate at a vertical position relative to the outer gate to define an accessible size of at least a portion of the inner gate opening, the locking mechanism fully surrounding two of the complete vertical members of the plurality of outer gate vertical members, the locking mechanism including an actuator configured to be biased into a locked position to hold the inner gate at the vertical position relative to the outer gate, the locking mechanism further including a first piece and a second piece, the first piece and the second piece being positioned on different sides, respectively, of one of the complete vertical members, the first piece and the second piece being coupled to each other with a fastener to fully surround, together:

(i) the one of the complete vertical members; and (ii) the actuator, wherein end portions of the inner gate vertical members extend through openings in the locking mechanism into an interior of the locking mechanism;

wherein the inner gate vertical members are fixed within the locking mechanism;

wherein the inner gate defines a closed position wherein the inner gate blocks access through the inner gate opening;

wherein the inner gate defines a plurality of partially open positions that provide at least partial access through the inner gate opening;

wherein the locking mechanism includes a spring to bias the actuator into the locked position to hold the inner gate at the vertical position relative to the outer gate;

wherein the locking mechanism is moveable relative to the spring into an unlocked position that allows the inner gate to move relative to the outer gate;

wherein the actuator is biased into the locked position to hold the inner gate relative to the outer gate; and wherein one of the complete vertical members of the plurality of outer gate vertical members defines two openings spaced apart from each other along the one of the complete vertical members of the plurality of outer gate vertical members, each of the two openings being sized to receive an engagement member of the locking mechanism.

14. The security gate of claim 13, wherein the locking mechanism includes opposing actuators that are biased into locked positions to hold the inner gate relative to the outer gate.

15. The security gate of claim 14, wherein another member extends within the interior of the locking mechanism horizontally from one of the end portions toward another of the end portions such that the end portions of the inner gate vertical members are fixed within the locking mechanism.

16. The security gate of claim 13, wherein another member extends within the interior of the locking mechanism horizontally from one of the end portions toward another of the end portions such that the end portions of the inner gate vertical members are fixed within the locking mechanism.

17. The security gate of claim 16, wherein the another member connects the one of the end portions and the another of the end portions.

18. The security gate of claim 17, wherein the inner gate vertical members and the another member form a U-shape.

19. The security gate of claim 13, wherein a vertical height of the inner gate opening is in a range from about 8 inches to about 15 inches, and wherein a horizontal width of the inner gate opening is in a range from about 6 inches to about 12 inches.

* * * * *